(12) United States Patent
Hsin et al.

(10) Patent No.: US 8,239,699 B2
(45) Date of Patent: Aug. 7, 2012

(54) METHOD AND APPARATUS FOR PERFORMING ENERGY-EFFICIENT NETWORK PACKET PROCESSING IN A MULTI PROCESSOR CORE SYSTEM

(75) Inventors: Chih-Fan Hsin, Hillsboro, OR (US); Jr-Shian Tsai, Beaverton, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 406 days.

(21) Appl. No.: 12/459,114

(22) Filed: Jun. 26, 2009

(65) Prior Publication Data

US 2010/0332869 A1 Dec. 30, 2010

(51) Int. Cl.
*G06F 1/26* (2006.01)
*G06F 1/00* (2006.01)

(52) U.S. Cl. ........ 713/320; 713/300; 713/310; 713/324; 709/238; 709/224; 370/235

(58) Field of Classification Search .................. 713/300, 713/310, 320, 324
See application file for complete search history.

(56) References Cited

U.S. PATENT DOCUMENTS

| | | | | |
|---|---|---|---|---|
| 7,257,572 | B2 * | 8/2007 | Eldar | 1/1 |
| 7,548,513 | B2 * | 6/2009 | Tran | 370/235 |
| 7,739,527 | B2 * | 6/2010 | Rothman et al. | 713/320 |
| 8,010,822 | B2 * | 8/2011 | Marshall et al. | 713/324 |
| 2002/0124196 | A1 | 9/2002 | Morrow et al. | |
| 2003/0084154 | A1 | 5/2003 | Bohrer et al. | |
| 2003/0110012 | A1 | 6/2003 | Orenstien et al. | |
| 2005/0188877 | A1 | 9/2005 | Scherge et al. | |
| 2006/0195698 | A1 * | 8/2006 | Pinkerton et al. | 713/181 |
| 2007/0005742 | A1 | 1/2007 | Eldar et al. | |
| 2007/0070904 | A1 * | 3/2007 | King et al. | 370/235 |
| 2008/0005352 | A1 | 1/2008 | Goglin et al. | |
| 2008/0077792 | A1 * | 3/2008 | Mann | 713/160 |
| 2009/0006521 | A1 | 1/2009 | Veal et al. | |
| 2009/0235260 | A1 * | 9/2009 | Branover et al. | 718/102 |
| 2010/0064286 | A1 * | 3/2010 | Pinter et al. | 718/102 |
| 2010/0153590 | A1 * | 6/2010 | Hsin et al. | 710/22 |
| 2010/0284404 | A1 * | 11/2010 | Gopinath et al. | 370/392 |

FOREIGN PATENT DOCUMENTS

WO 2010/151824 A2 12/2010

OTHER PUBLICATIONS

Intel White Paper—"Improving Network Performance in Multi-Core Systems"; 4 pages, Dated 2007.*
International Search Report and Written Opinion received for PCT Application No. PCT/US2010/040083, mailed on Jan. 26, 2011, 9 pages.
"Scalable Networking: Eliminating the Receive Processing Bottleneck—Introducing RSS", Microsoft, Windows Hardware and Driver Central, WinHEC 2004 Version, Apr. 14, 2004, 17 pages, also available at: http://www.microsoft.com/whdc/.

* cited by examiner

*Primary Examiner* — Brian Misiura

(57) ABSTRACT

A method and apparatus for managing core affinity for network packet processing is provided. Low-power idle state of a plurality of processing units in a system including the plurality of processing units is monitored. Network packet processing is dynamically reassigned to processing units that are in a non-low power idle state to increase the low-power idle state residency for processing units that are in a low-power idle state resulting in reduced energy consumption.

12 Claims, 4 Drawing Sheets

METHOD AND APPARATUS FOR PERFORMING ENERGY-EFFICIENT NETWORK PACKET PROCESSING IN A MULTI PROCESSOR CORE SYSTEM

FIELD

This disclosure relates to and in particular to energy-efficiency in a multi-processor core system and in particular to energy-efficient network packet processing.

BACKGROUND

Typically, a computer system having a plurality of processor cores handles a high workload by distributing the workload amongst all of the processor cores. However, as the workload decreases, each of the plurality of processor cores may be underutilized.

In order to reduce power consumption by the plurality of processor cores when workload is low, an operating system may adjust the number of processor cores used based on the system utilization level. The unused processor cores are placed in a low-power idle state ("parked") and can remain at the low-power idle state for long consecutive intervals. The operating system continues to distribute the workload amongst the processor cores that are not in the low-power idle state.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

A computer system may include a network interface controller (adapter, card) that receives a network packet from the network and forwards the received network packet for processing to one of a plurality of processor cores. The workload that is distributed amongst the processor cores may include the processing of network packets received by the network interface controller.

For example, in the computer system, the processing of network packets may be distributed amongst the processor cores such that the processing of the same traffic flow (for example, network packets having the same source address and destination address) is performed by the same processor core. When workloads are low, the operating system may use only a subset of the plurality of the processor cores and put the other processor cores in low-power idle state. However, if a received network packet to be processed for a particular traffic flow is assigned to a processor core (core affinity setting for the traffic flow) that is in a low-power idle state, the processor core is woken up from the low-power idle state. As a result, processor cores that are in a low-power idle state do not have the opportunity to stay in the low-power idle state for a long time.

An embodiment of the present invention dynamically adjusts the core affinity settings for network packet processing based on whether the operating system has put any of the processor cores into a low-power idle state.

An embodiment of the present invention will be described for a computer system having a network interface controller that supports Receive-Side Scaling (RSS) used by Microsoft's® Windows® Operating System (OS). However, the invention is not limited to RSS. In other embodiments, the network adapter may support Scalable Input/Output (I/O) used by the Linux operating system that includes a scheduler which has a power-saving mode feature or any other operating system that includes a power-saving mode.

Figure 1:
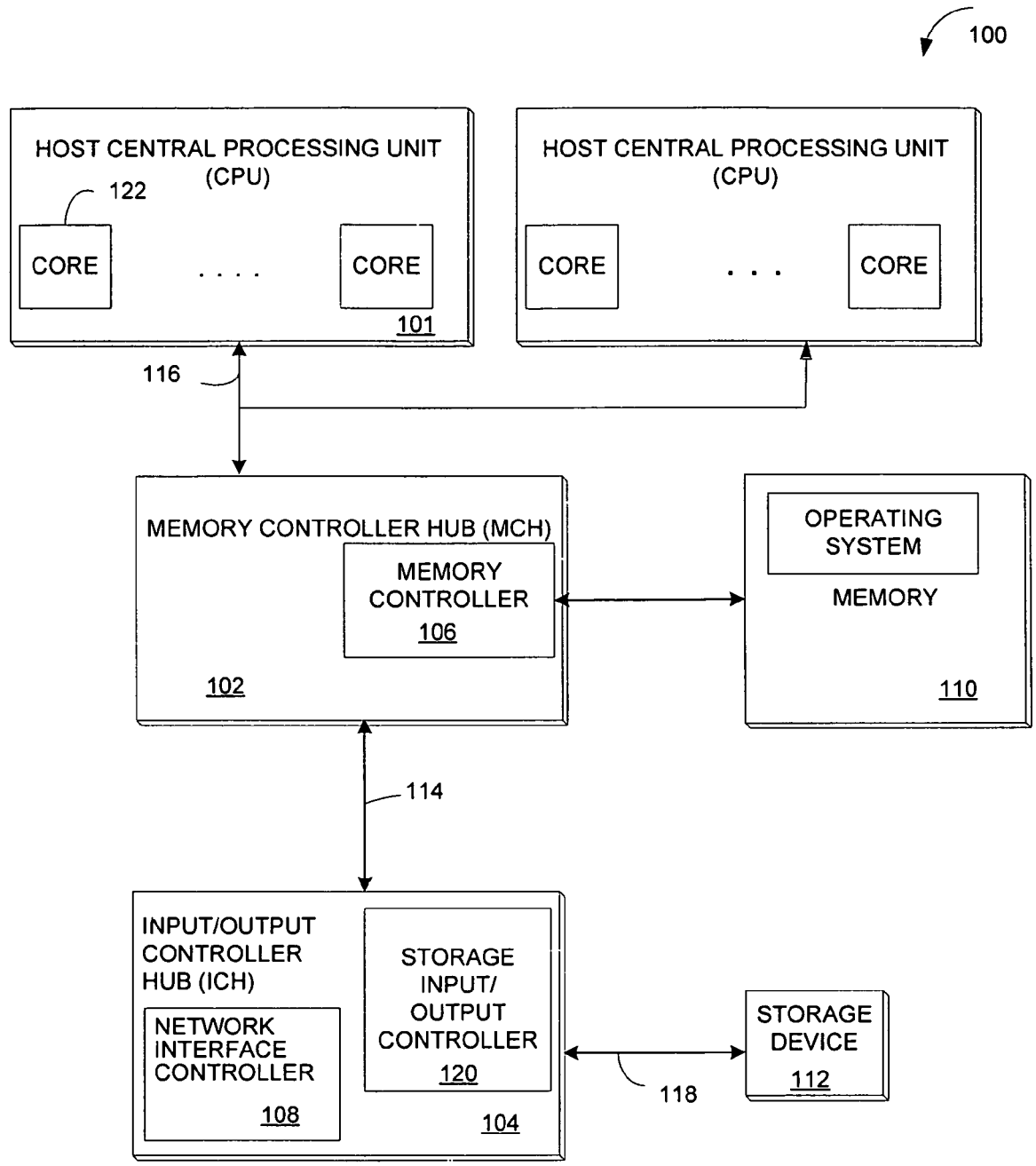
FIG. 1 is a block diagram of a system that includes an embodiment of a Network Interface Controller that supports Receive-Side Scaling.

FIG. 1 is a block diagram of a system 100 that includes an embodiment of a Network Interface Controller 108 that supports Receive-Side Scaling. The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 110. The processor 101 and MCH 102 communicate over a system bus 116.

The processor 101 may be a multi-core processor such as Intel® Pentium D, Intel® Xeon® processor, or Intel® Core® Duo processor, Intel) Core™ i7 Processor or any other type of processor. In the embodiment shown, the system includes two multi-core processors 101 each having at least two processor cores ("cores") 122. In one embodiment, each multi-core processor includes four cores 122.

The memory 110 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage Input/Output (I/O) controller for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

In another embodiment, the network interface controller 108 may be included in an ICH 104 that does not include a storage I/O controller 120 or may be included on a separate network interface card that is inserted in a system card slot in the system 100.

Figure 2:
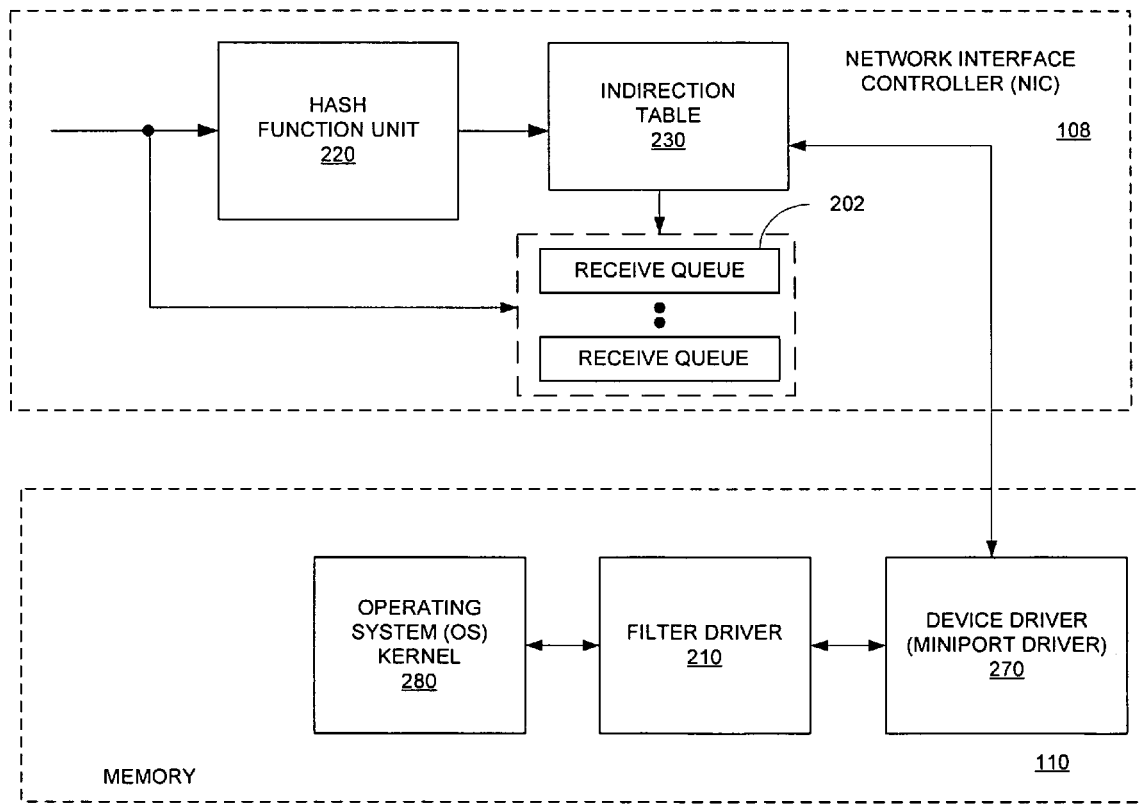
FIG. 2 is a block diagram illustrating an embodiment of the network interface controller and memory shown in FIG. 1.

FIG. 2 is a block diagram illustrating an embodiment of the network interface controller 108 and memory 110 shown in FIG. 1. The network interface controller 108 includes a hash function unit 220, an indirection table 230 and a plurality of hardware receive queues 202. The memory 110 includes an operating system kernel 280, a filter driver 210 and a network device driver (miniport driver) 270. In an embodiment, hash function unit 220 and indirection table 230 are included in the network interface controller ("NIC") 108. In another embodiment, some of these components or some elements of these components may be located outside the network interface controller 108.

In the embodiment shown, the miniport driver 270 and filter driver 210 are components of a Microsoft® Windows® operating system model (WDM). The WDM includes device function drivers which may be class drivers or miniport drivers. A miniport driver supports a particular type of device, for example, a specific network interface controller 108. A filter driver 210 is an optional driver that adds value to or modifies the behavior of the function driver (miniport driver) 270.

The Network Driver Interface Specification (NDIS) is a library of functions accessed via an application programming interface (API) for network interface controllers 110. The NDIS acts as an interface between layer 2 (link layer) and layer 3 (network layer) of the 7 layer Open Systems Interconnect (OSI). The library functions include Object Identifiers (OIDs).

The network interface controller 108 may use a hashing function in the hash function unit 220 to compute a hash value over a hash type (for example, one or more fields in the headers ) within the received network packet. A number of least significant bits of the hash value may be used to index an entry in an indirection table 230 that identifies a processor core 122 (FIG. 1) to handle processing of the received data packet and one of a plurality of receive queues 202 to store the received data packet. The network interface controller 108 can interrupt the identified processor core 122.

In an embodiment, as each network packet is received by the network interface controller 108, the "flow" associated with the network packet is determined. The "flow" of a Transport Control Protocol (TCP) packet may be determined based on the value of fields in the TCP header and the Internet Protocol (IP) header included in the packet. For example, a flow identifier for the "flow" can be dependent on a combination of the IP source address and IP destination address included in the IP header and the source port address and destination port address included in the TCP header in the received network packet.

The plurality of hardware receive queues 202 are provided to store received network packets. In order to ensure in-order packet delivery for a particular flow, each of he hardware receive queues 202 may be assigned to a different flow and also to one of the plurality of processor cores 122. Thus, each of the plurality of hardware receive queues 202 is associated with one of the plurality of a core processors 122 via the indirection table 230.

In the embodiment shown, the network interface controller 108 has eight receive queues 202. However, the number of receive queues 202 is not limited to eight. In other embodiments there may be more or less receive queues 202. Received network packets are stored in one of the plurality of receives queues 202. Packet processing of each of the receive queues 202 may be affinitized to a specific processor core 122. In an embodiment of the present invention, the core affinity settings for packet processing is dynamically adjusted based on the number of processor cores 122 that are in a power-saving idle state ('parked').

Table 1 below illustrates an example of an indirection table 230 with an initial assignment of receive queues 202 to processor cores 122 in a system having eight cores and eight receive queues in order to distribute receive packet processing amongst all of the processor cores 122.

TABLE 1

| RECEIVE QUEUE | CORE |
|---|---|
| 0 | 0 |
| 1 | 1 |
| 2 | 2 |
| 3 | 3 |
| 4 | 4 |
| 5 | 6 |
| 6 | 7 |
| 7 | 8 |

Figure 3:
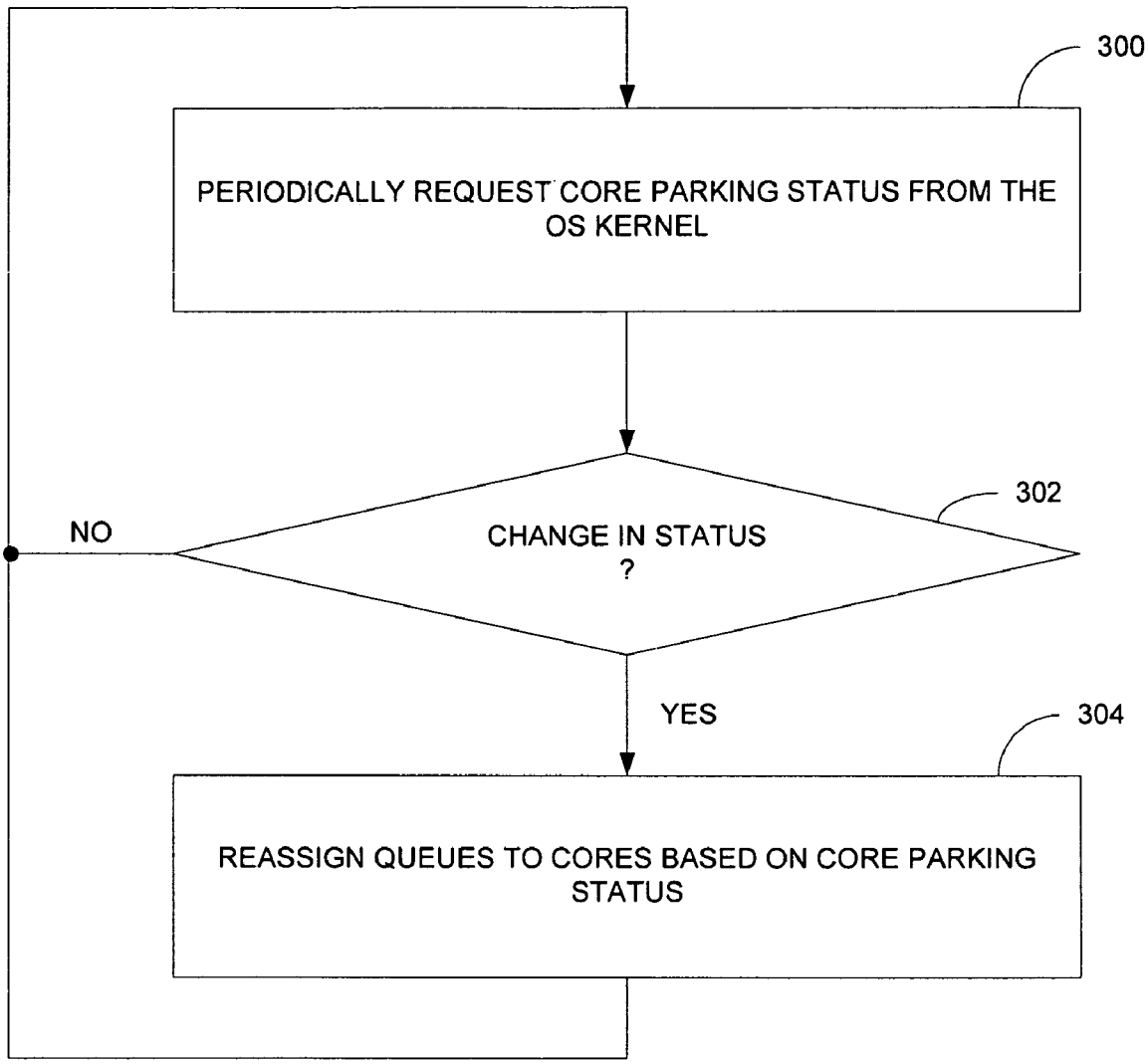
FIG. 3 is a flowgraph of an embodiment of a method to dynamically adjust core affinity settings according to the principles of the present invention.

FIG. 3 is a flowgraph of an embodiment to dynamically adjust the core affinity settings according to the principles of the present invention.

The distribution of receive queues 202 to core processors 122 is dynamically modified based on operating system (OS) core parking status which is handled by the OS kernel. For example, when workload is low, the OS kernel may "park" a portion of the core processors 122 by putting them into a low-power idle state. For example, in an embodiment with eight core processors, 6 of 8 core processors may be "parked" and the other portion (for example, 2 of 8) of the core processors may be used. Thus, interrupts from the network interface controllers are only sent to the un-parked cores and the parked cores remain at low-power idle states resulting in a reduction in energy consumption.

For example, in an embodiment, if Windows® 7 server core parking feature selects to use three cores and parks the remaining cores when the workloads are low, the network interface controller is modified to run network interrupt and packet processing also on the selected three cores. This results in an increase in the lower-power idle state residency for the parked cores.

In an embodiment, a 10 Gigabit network interface controller has multiple Receive Side Scaling Receive (RSS Rx) queues, each affinitized to a specific core. The network interface controller gets the configuration of OS core parking settings via the filter driver 210 and modifies the RSS indirection table 230 based on the OS core parking configuration.

At block 300, the filter driver 210 periodically requests OS parking status from the OS kernel 280. For example, in an embodiment, the filter driver 210 requests the OS core parking status using an Application Program Interface (API) command provided by the OS kernel 280 to query parking status of each of the processor cores 122. In an embodiment, the filter driver 210 periodically requests OS parking status based on the number of network packets that have been received, for example, after every about 1000 network packets have been received In an alternative embodiment, the filter driver 210 accesses the CPU 101 directly to obtain the current power state of each processor core 202. For example, the Intel® Core™ i7 supports low power states at the core level for optimal power management. The core power states include C0, C1, C3 and C6. C0 is the normal operating state and C1, C3 and C6 are low power states, with different levels of reduced power consumption. For example, in the C3 low power state, all the clocks are stopped and the processor core maintains all of its architectural state except for the caches.

The current power state of each processor core 202 is stored in one or more registers in the CPU 101 that are accessible by the filter driver 210. In order to determine whether a particular core is "parked", the filter driver 210 periodically reads the registers storing the power state for the cores and infers whether the core is "parked" based on the distribution of the power state type read for the core over a time period. For example, if within a time period, the registers are read n times and a core is in low power state each time, the core is "parked". If during the time period, the core is in a high power state n times, the core is not "parked". If during the time period, the power state of the core differs, with the number of times that the power state is low power state being greater than the number of times that power state is high power state, the core is inferred to be "parked".
Processing continues with block 302.

At block 302, having received the parking status of each of the processor cores 122, the filter driver 210 determines if the parking status of any of processor cores 122 has changed. If not, processing continues with block 300 to continue to periodically request parking status of processor cores 122.

If so, the filter driver 210 generates new data to be stored in the indirection table 230 in the NIC 108 based on the parking status. The filter driver 210 uses an OID_GEN_RECEIVE_SCALE_PARAMETERS Object Identifier (OID) to modify the RSS parameters of the NIC based on the parking status of the processor cores. The OID_GEN_RECEIVE_SCALE_PARAMETERS OID includes an NDIS_RECEIVE_SCALE_PARAMETERS structure that specifies the RSS parameters.

In an embodiment, the structure includes a header with a type that specifies that the object includes RSS Parameters, a flag indicating whether the indirection table and associated members have changed, and the size of the indirection table. The new data to be stored in the indirection table 230 based on the core parking status are appended after the other structure members. Processing continues with block 304.

At block 304, upon detecting receipt of an OID_GEN_RECEIVE_SCALE_PARAMETERS OID, the miniport driver 270 stores the received new data for the indirection table 230 in the indirection table 230. For example, if the retrieved core parking status indicates that only processor core 0 and processor core 4 are un-parked, in an embodiment in which there are eight receive (RSS Rx) queues 202, a round-robin core assignment can be performed resulting in the new data (contents of the indirection table) as shown in Table 2 below stored in indirection table 230. Processor core 0 is assigned to receive queues 0, 2, 4, and 6, and processor core 4 is assigned to receive queues 1, 3, 5, and 7.

TABLE 2

| RECEIVE QUEUE | CORE |
|---|---|
| 0 | 0 |
| 1 | 4 |
| 2 | 0 |
| 3 | 4 |
| 4 | 0 |
| 5 | 4 |
| 6 | 0 |
| 7 | 4 |

For example, the data to be stored in Table 2 can be represented as a data structure IndTable as shown below:
IndTable[0]=0
IndTable[1]=4
IndTable[2]=0
IndTable[3]=4
IndTable[4]=0
IndTable[5]=4
IndTable[6]=0
IndTable[7]=4

The IndTable structure is appended to the OID which is received by the miniport driver 270 allowing the miniport driver 270 to update the data stored in the indirection table 230.

An embodiment has been described for a system that includes a filter driver 210. However, the monitoring of the core parking status and request for modification of the indirection table 230 is not limited to the filter driver 210. In another embodiment these functions may be included in another part of the network driver stack.

Figure 4:
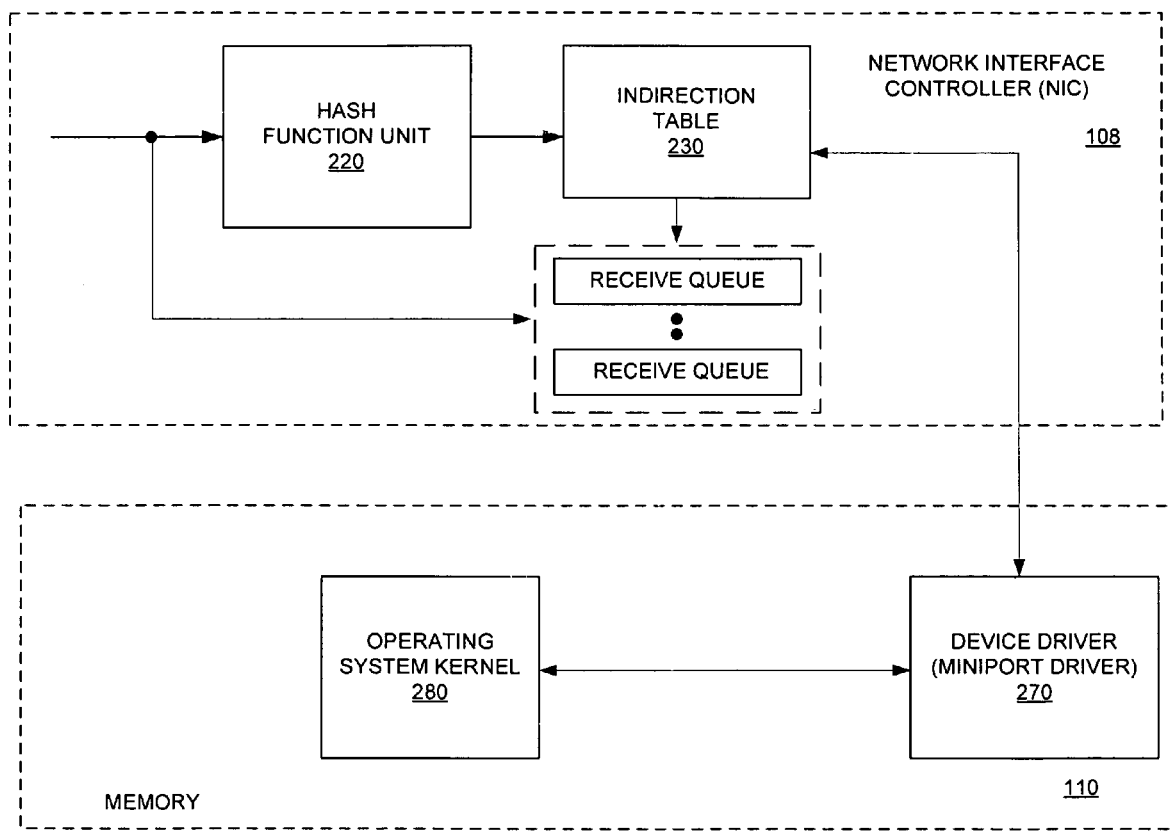
FIG. 4 is a block diagram illustrating another embodiment of the network interface controller and memory shown in FIG. 1.

FIG. 4 is a block diagram illustrating another embodiment of the network interface controller 108 and memory 110 shown in FIG. 1.

As shown in FIG. 4, instead of adding a filter driver 210 (FIG. 2) to the network driver stack, the monitoring of core parking status is performed by the OS kernel 280. The request to update the indirection table 230 is sent directly from the OS kernel 280 to the miniport driver 270. Similar to the embodiment discussed for the filter driver 210 in conjunction with FIG. 2, the OS kernel 280 generates an OID_GEN_RECEIVE_SCALE_PARAMETERS OID with the modified contents for the indirection table 230 as an input parameter as discussed in conjunction with the embodiment shown in FIG. 2. This OID is sent directly to the device driver 270 which modifies the indirection table 230 accordingly based the received modified contents.

In an embodiment, an RSS alignment function is added to the OS core to adjust the RSS indirection table 230.

An embodiment has been described for the Windows® Operating System. The monitoring of core parking status and modification of the contents of the indirection table 230 based on the monitored core parking status is not limited to the Windows® Operating System, the method may also be applied to other operating systems, for example, the Linux Operating System.

Alternative embodiments of the invention also include machine-accessible media containing instructions for performing the operations of the invention. Such embodiments may also be referred to as program products. Such machine-accessible media may include, without limitation, computer readable storage media having instructions (computer readable program code) stored thereon such as floppy disks, hard disks, Compact Disk-Read Only Memories (CD-ROM)s, Read Only Memory (ROM), and Random Access Memory (RAM), and other tangible arrangements of particles manufactured or formed by a machine or device. Instructions may also be used in a distributed environment, and may be stored locally and/or remotely for access by single or multi-processor machines.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A method comprising:
   monitoring, by a filter driver associated with a network interface controller, low-power idle status of each of a plurality of processing units; and
   adaptively re-assigning flows assigned to processing units having low power idle status to other processing units having non-low power idle status to reduce energy consumption by the plurality of processing units.

2. The method of claim 1, wherein adaptively re-assigning flows comprises re-assigning the flows through an indirection table, the indirection table including a plurality of entries, each entry including an identification of a processing unit to which a flow associated with a queue is assigned.

3. The method of claim 1, wherein the monitoring of low-power idle status of the plurality of processing units is performed by an operating system.

4. An article including a machine-accessible medium having instructions stored thereon, wherein the instructions, when executed, results in a machine performing:
  monitoring, by a filter driver associated with a network interface controller, low-power idle status of each of a plurality of processing units; and
  adaptively re-assigning flows assigned to processing units having low power idle status to other processing units having non-low power idle status to reduce energy consumption by the plurality of processing units.

5. The article of claim 4, wherein adaptively re-assigning flows comprises re-assigning the flows through an indirection table, the indirection table including a plurality of entries, each entry including an identification of a processing unit to which a flow associated with a queue is assigned.

6. The article of claim 4, wherein the monitoring of low-power idle status of the plurality of processing units is performed by an operating system.

7. An apparatus comprising:
  a plurality of processing units; and
  a filter driver associated with a network interface controller to monitor low-power idle status of each of the plurality of processing units and to adaptively re-assign flows assigned to processing units having low power idle status to other processing units having non-low power idle status to reduce energy consumption by the plurality of processing units.

8. The apparatus of claim 7, further comprising:
  an indirection table including a plurality of entries, each entry including an identification of a processing unit to which a flow associated with a queue is assigned, the filter driver to adaptively re-assign flows by re-assigning the flows through the indirection table.

9. The apparatus of claim 7, wherein the filter driver is included in an operating system.

10. A system comprising:
  a disk drive;
  a plurality of processing units; and
  a filter driver associated with a network interface controller to monitor low-power idle status of each of the plurality of processing units and to adaptively re-assign flows assigned to processing units having low power idle status to other processing units having non-low power idle status to reduce energy consumption by the plurality of processing units.

11. The system of claim 10, further comprising:
  an indirection table including a plurality of entries, each entry including an identification of a processing unit to which a flow associated with a queue is assigned, the filter driver to adaptively re-assign flows by re-assigning the flows through the indirection table.

12. The system of claim 10, wherein the filter driver is included in an operating system.

* * * * *